United States Patent
Yoshii et al.

(10) Patent No.: US 6,864,934 B2
(45) Date of Patent: *Mar. 8, 2005

(54) LCD WITH IRREGULAR REFLECTION SURFACE REFLECTOR AND LIGHT SCATTERING ELEMENT

(75) Inventors: Katsumasa Yoshii, Fukushima-ken (JP); Tetsushi Tanada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/795,750

(22) Filed: Mar. 8, 2004

(65) Prior Publication Data

US 2004/0169800 A1 Sep. 2, 2004

Related U.S. Application Data

(63) Continuation of application No. 10/338,626, filed on Jan. 7, 2003, now Pat. No. 6,734,934.

(30) Foreign Application Priority Data

Jan. 9, 2002 (JP) .......................................... 2002-002621

(51) Int. Cl.[7] ............................................. G02F 1/1335
(52) U.S. Cl. ........................... 349/113; 349/64; 349/112

(58) Field of Search .............................. 349/64, 112, 113

(56) References Cited

U.S. PATENT DOCUMENTS

| 4,266,859 A | | 5/1981 | Togashi |
| 4,298,249 A | | 11/1981 | Gloor et al. |
| 5,956,112 A | | 9/1999 | Fujimori et al. |
| 6,141,073 A | * | 10/2000 | Sasaki et al. ............... 349/122 |
| 6,219,122 B1 | | 4/2001 | Uchida et al. |
| 6,522,374 B1 | | 2/2003 | Shie et al. |
| 2003/0107692 A1 | * | 6/2003 | Sekiguchi .................. 349/113 |
| 2004/0070710 A1 | * | 4/2004 | Yoshii ........................ 349/113 |

FOREIGN PATENT DOCUMENTS

JP           8-248414         9/1996

* cited by examiner

*Primary Examiner*—Andrew Schechter
(74) *Attorney, Agent, or Firm*—Brinks Hofer Gilson & Lione

(57) ABSTRACT

In a liquid crystal display, first and second substrates are provided opposing each other with a liquid crystal layer held between them, the outer surface of the first substrate serves as a light scattering surface having a light scattering characteristic, and a reflector including an irregular reflection surface is provided on the light scattering surface so that the reflection surface is on the light scattering surface side.

3 Claims, 4 Drawing Sheets

LCD WITH IRREGULAR REFLECTION SURFACE REFLECTOR AND LIGHT SCATTERING ELEMENT

This application is a continuation application of U.S. application Ser. No. 10/338,626 filed on Jan. 7, 2003, entitled "External Reflective Type Liquid Crystal Display", now U.S. Pat. No. 6,734,934.

BACKGROUND OF THE INVENTION

1. Field of the Invention

The present invention relates to an external type liquid crystal display including a liquid crystal cell having a pair of opposing transparent substrates with a liquid crystal layers held therebetween, and a reflector provided on an outer surface of the liquid crystal cell. The invention more particularly relates to a liquid crystal display having improved visibility by providing the liquid crystal cell with a light scattering characteristic.

2. Description of the Related Art

Liquid crystal displays are generally divided into semi-transmissive or transmissive type displays having a backlight and reflective type displays. The reflective type liquid crystal display utilizes only external light such as sunlight and illumination for display and does not use a backlight. This type of display is widely used for mobile information terminals that should be thin and lightweight, and operate with low power consumption. The reflective type liquid crystal display includes a reflector that reflects incoming light from the display surface side for display. Some reflectors have a mirror surface and others have an irregular surface. The reflector having an irregular surface is more suitable for obtaining a wider viewing angle than the reflector with a mirror surface.

FIG. 4 is a schematic sectional view of a conventional reflective type liquid crystal display including a reflector with an irregular surface. The conventional liquid crystal display 200 includes a liquid crystal cell 220, and a front light 210 provided in front of the liquid crystal cell 220 (in the upper part of FIG. 4).

The conventional front light 210 includes a light guide plate 212, and a light source 213 of a cold cathode tube provided at the side end face 212a of the light guide plate 212. The light guide plate 212 has an emission surface 212b as a lower surface (the surface on the side of the liquid crystal cell 220), from which light is emitted. The surface on the opposite side to the emission surface 212b (the upper surface of the light guide plate 212) is a prism surface 212c that can change the optical path of light propagating through the light guide plate 212 toward the emission surface 212b.

The liquid crystal cell 220 has first and second opposing substrates 221 and 222 joined to each other by a seal member 224 and having a liquid crystal layer 223 therebetween. There are display circuits 226 and 227 on the first and second substrates 221 and 222 on the side of the liquid crystal layer 223 (at the inner side). A reflector 230 is provided on the side of the first substrate 221 opposite to the liquid crystal layer 223 (at the outer side) through an adhesive layer 231. The reflector 230 includes a reflector substrate 228 having one irregular surface, and a reflection layer 229 formed on the irregular surface of the reflector substrate 228. The reflection layer 229 is located on the side of the first substrate 221.

In the liquid crystal display 200 having the above structure, when the front light 210 is turned on, light emitted from the light source 213 is propagated in the light guide plate 212 and emitted from the emission surface 212b. The light emitted from the emission surface 212b is let into the liquid crystal cell 220 as the illumination light, sequentially passed through the second substrate 222, the display circuit 226, the liquid crystal layer 223, the display circuit 227, the first substrate 221, and the adhesive layer 231 and reflected by the reflection layer 229. The reflected light is returned to the outer side of the liquid crystal cell 220 (the side of the front light 210), and reaches the viewer through the emission surface 212b and the prism surface 212c of the front light 210. In this way, the displayed content at the liquid crystal cell 220 is viewed by the viewer.

When sunlight is used for display rather than turning on the front light 210, sunlight comes into the liquid crystal cell 220 through the prism surface 212c and the emission surface 212b of the front light 210, and light reflected by the reflection layer 229 is viewed by the viewer similarly to the above described case.

However, the ongoing development and designing of the reflective type liquid crystal displays including the reflect or with the irregular reflection surface aims at forming fine irregularities (raise and recessed portions) on the reflection surface to adjust the angle of the reflected light and controlling the irregular geometry to control even the directivity of the reflected light. The fine irregularities on the reflection surface surely improve the controllability of the reflected light, but there is a problem that a spectrum is more likely to occur under intense sunlight, which could cause a rainbow-like pattern (hereinafter simply as "rainbow") to be observed on the display screen, in other words, the visibility is lowered.

SUMMARY OF THE INVENTION

The present invention is directed to a solution to the above problem, and a liquid crystal display including a reflector having an irregular surface that can prevent a rainbow from appearing on the screen is provided.

In order to solve the above problem, the liquid crystal display according to the invention includes a pair of opposing transparent substrates having a liquid crystal layer held therebetween. An outer surface of one of the transparent substrates serves as a light scattering surface having a light scattering characteristic. A reflector having an irregular reflection surface is provided on the light scattering surface so that the reflection surface is on the side of the light scattering surface.

The liquid crystal display according to the invention includes the light scattering surface between the reflection surface and the liquid crystal layer, and therefore light reflected by the reflection surface of the reflector is scattered as it passes through the light scattering surface, despite a spectrum caused at the irregularities at the reflection surface. Therefore, the rainbow is prevented from being generated at the display screen.

According to the invention, the light scattering surface preferably has irregularities.

In this manner, the outer surface of one of the transparent substrates on the side (light scattering surface) having the reflector is provided with irregularities, so that the surface may have a preferable light scattering characteristic.

According to the invention, the haze of the light scattering surface is preferably in the range from 15% to 30%.

As will be described, the haze is an index of the degree of light scattering. When the outer surface (light scattering surface) of the above-mentioned one transparent substrate has too small a light scattering characteristic, there is not a sufficient rainbow elimination effect at the display screen. Meanwhile, when the light scattering characteristic is too large, the display characteristic at the screen is significantly lowered. When the haze at the outer surface (light scattering surface) of the above mentioned one transparent substrate is in the range from 15% to 30%, the display characteristic of the liquid crystal display can be restrained from being lowered, while the rainbow at the display screen can be prevented.

According to the invention, the reflector is provided on the light scattering surface through the adhesive layer and the difference between the refractive index of one transparent substrate having the light scattering surface and the refractive index of the adhesive layer is preferably at least 0.01.

In this way, the refractive indexes of the light scattering surface and the adhesive layer can be different, so that light reflected by the reflection surface of the reflector can effectively be scattered at the light scattering surface, and the rainbow can be prevented from being generated.

The thickness of one transparent substrate having the light scattering surface is preferably smaller than the thickness of the other transparent substrate.

The illumination light passed through the liquid crystal layer near the reflector is let into the above mentioned one transparent substrate, passed the substrate and then reflected by the reflector. The reflected light is passed once again through the above described transparent substrate and then passed through the liquid crystal layer.

When the above mentioned one transparent substrate provided near the reflector is made thinner, the display can become even thinner and lighter, and the transmission loss as the light passes through the transparent substrate can be reduced.

When the above mentioned one transparent substrate is made thinner, the shift between the position where the light passes before the reflection and the position where the light reflected by the reflector passes through can be smaller at the interface between the liquid crystal layer and the transparent substrate. Therefore, clearer display can be provided. When in particular a color filter is provided on the transparent substrate that is thin, the shift between the position of the color filter where the light passes before the reflection, and the position of the color filter where the illumination light reflected by the reflector passes can be smaller. Therefore, color shift and parallax can be reduced and high definition color display can be carried out.

DESCRIPTION OF THE PREFERRED EMBODIMENTS

Figure 1:
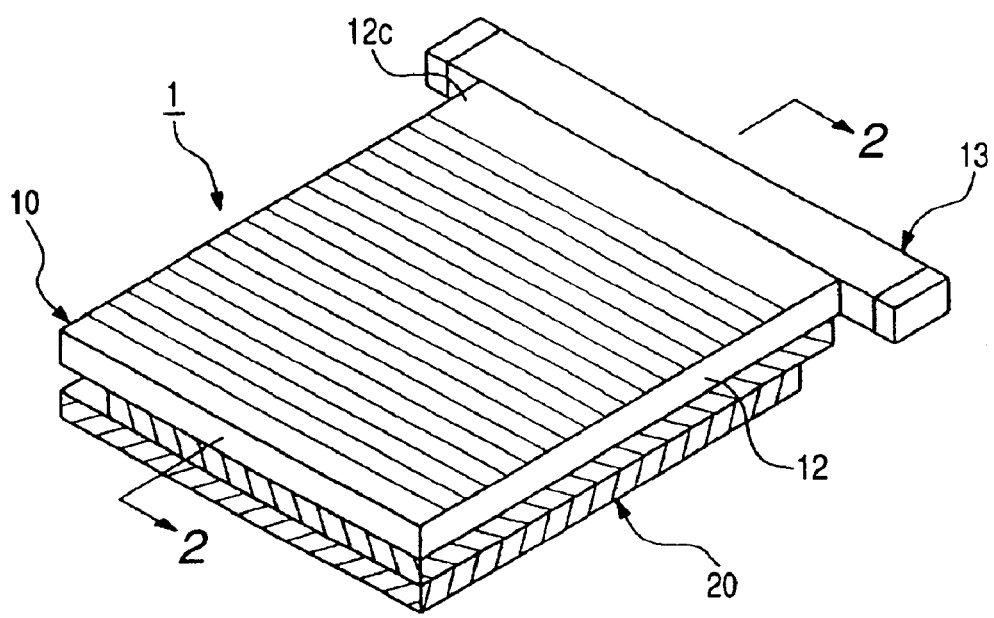
FIG. 1 is a perspective view of a liquid crystal display according to one embodiment of the invention.
Figure 2:
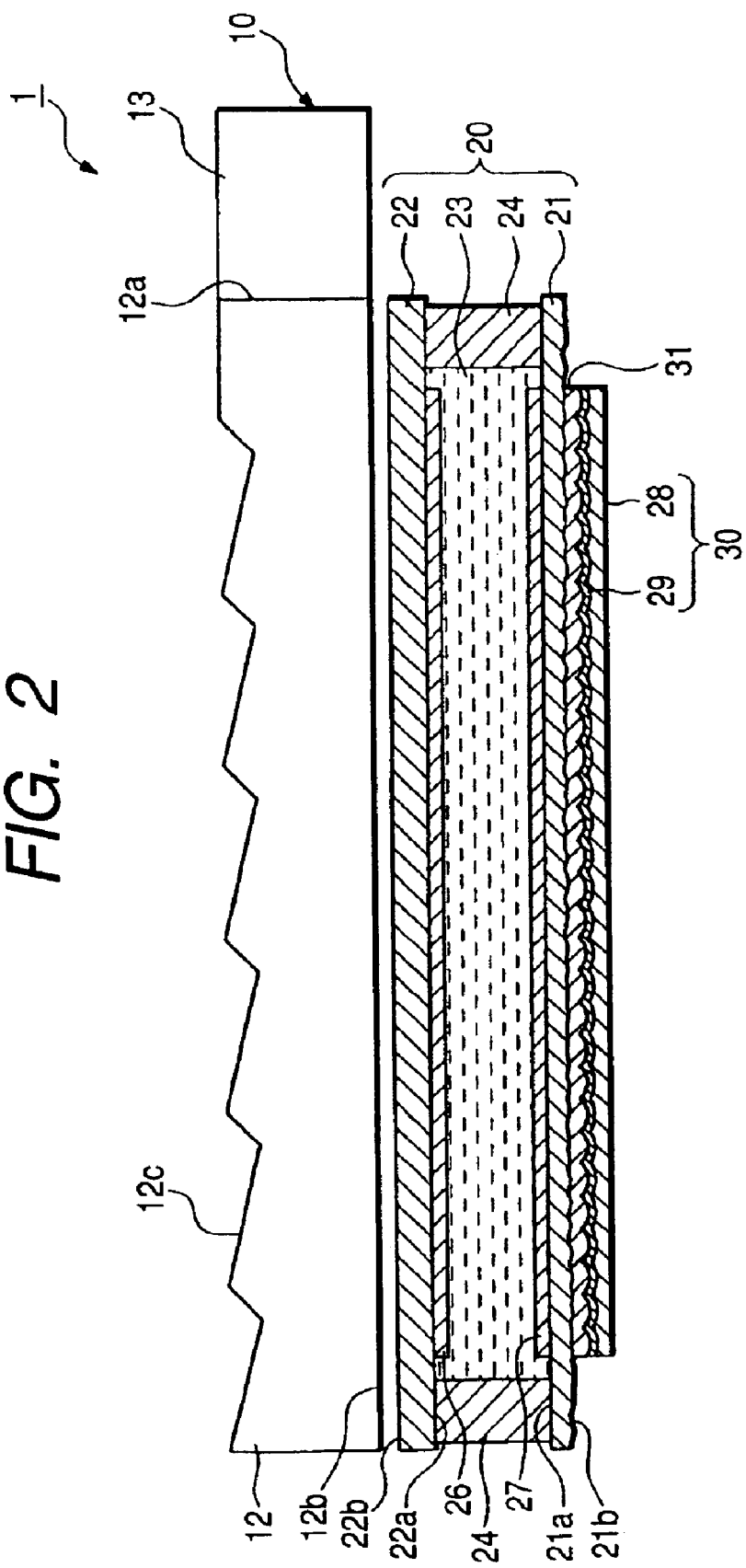
FIG. 2 is a sectional view taken along line 2—2 in FIG. 1.

Now, a liquid crystal display according to one embodiment of the invention will be described in conjunction with FIGS. 1 and 2. FIG. 1 is a perspective view of the liquid crystal display according to the embodiment. FIG. 2 is a sectional view taken along line 2—2 in FIG. 1.

The liquid crystal display 1 according to the embodiment essentially includes a liquid crystal cell 20, a front light 10 provided on the viewer side of the liquid crystal cell 20, and a reflector 30 externally provided on the liquid crystal cell 20 on the side opposite to the side of front light 10.

The type of the front light 10 is not particularly limited, and a translucent, surface light emitting member in an arbitrary shape may be used. According to the embodiment, the front light 10 includes a transparent light guide plate 12 made of acrylic resin, for example, and a light source 13 of a cold cathode tube provided at the side end face 12a of the light guide plate 12. The lower surface of the light guide plate 12 (the surface on the side of liquid crystal cell 20) forms a smooth emission surface 12b from which light is emitted. The surface on the side of the light guide plate 12 opposite to the emission surface 12b (the upper surface of the light guide plate 12) forms a prism surface 12c having a plurality of wedge shaped grooves in a stripe shape at prescribed pitches. The grooves are provided to change the direction of light propagating in the light guide plate 12.

The liquid crystal cell 20 essentially includes first and second opposing substrates 21 and 22 having a liquid crystal layer 23 held therebetween. The substrates are integrally joined by a seal member 24.

The first and second substrates 21 and 22 are made of a transparent substrate such as a glass substrate, and there are display circuits 26 and 27, respectively on their liquid crystal layer 23 sides (at their inner sides).

The display circuits 26 and 27, though not shown, may include for example an electrode layer made of a transparent conductive film to drive the liquid crystal layer 23, and an alignment film to control the alignment of the liquid crystal layer 23. When color display is carried out, the circuits may include a color filter.

The second substrate 22 provided on the viewer side has its both surfaces (the inner and outer surfaces 22a and 22b) finished into a mirror surface. The second substrate 22 preferably has a thickness about in the range from 0.3 mm, to 1.1 mm.

Meanwhile, the first substrate 21 on the side of the reflector 30 is thinner than the second substrate 22 and has its inner surface 21a finished into a mirror surface and its outer surface 21b formed to have irregularities. The first substrate 21 preferably has a thickness about in the range from 0.1 mm to 0.7 mm.

The first substrate 21 is preferably formed by grinding or chemically etching the entire one surface (outer surface 21b) of a transparent substrate identical to the second substrate 22 so that the part is thinned and the surface becomes rough. In a particularly preferable manner, the liquid crystal cell 20 is assembled using two identical transparent substrates, and then one of the transparent substrates has its outer surface ground before the reflector 30 is attached.

The outer surface 21b of the first substrate 21 is rough and provided with fine irregularities, which makes the surface scatter light, in other words, the surface serves as a light scattering surface.

The degree of light scattering at the surface can be controlled by changing the grinding or chemical etching conditions and thus changing the surface roughness. The degree of scattering of light at the light scattering surface is preferably in the range from 15% to 30% in terms of haze, more preferably from 20% to 30%, even more preferably from 20% to 25%.

Herein, the haze is the ratio of diffuse transmittance (%) to the total light transmittance (%) and used as an index of the degree of light scattering. The value of haze according to the invention is obtained by a measuring method based on JIS K 7105.

According to the embodiment, when the haze of the outer surface (light scattering surface) 21b of the first substrate 21 is less than 15%, the rainbow on the display screen cannot be eliminated as effectively as intended. Conversely, when the haze is more than 30%, there is too much scattering of light, which lowers the reflection efficiency of the illumination light, and the screen could be darkened, or the contrast on the display screen could be lowered, in other words, the display characteristics can significantly be degraded.

The reflector 30 has irregularities on the reflection surface, reflects and diffuses incoming light. According to the embodiment, the reflector includes a reflector substrate 28, one surface of which is an irregular surface, and a reflection layer 29 provided on the irregular surface of the reflector substrate 28.

The reflector 30 is adhesively joined with the outer surface 21b of the first substrate 21 under the liquid crystal cell 20 through an adhesive layer 31 so that the reflection layer 29 is directed to the side of the liquid crystal cell 20.

Figure 3:
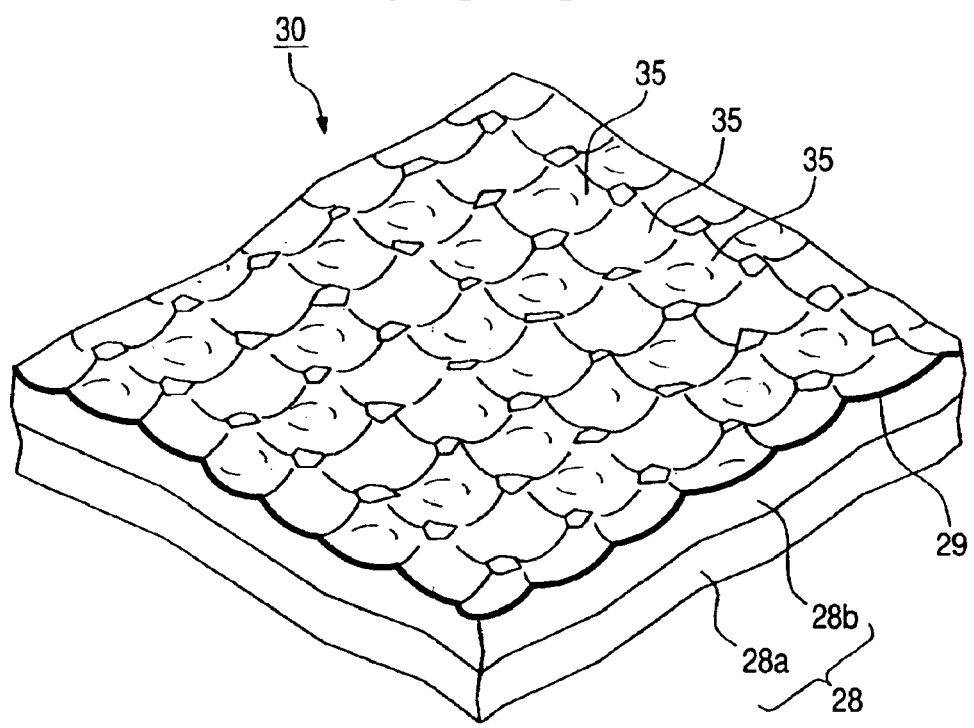
FIG. 3 is a perspective view of a main part of a reflector according to the invention.
Figure 4:
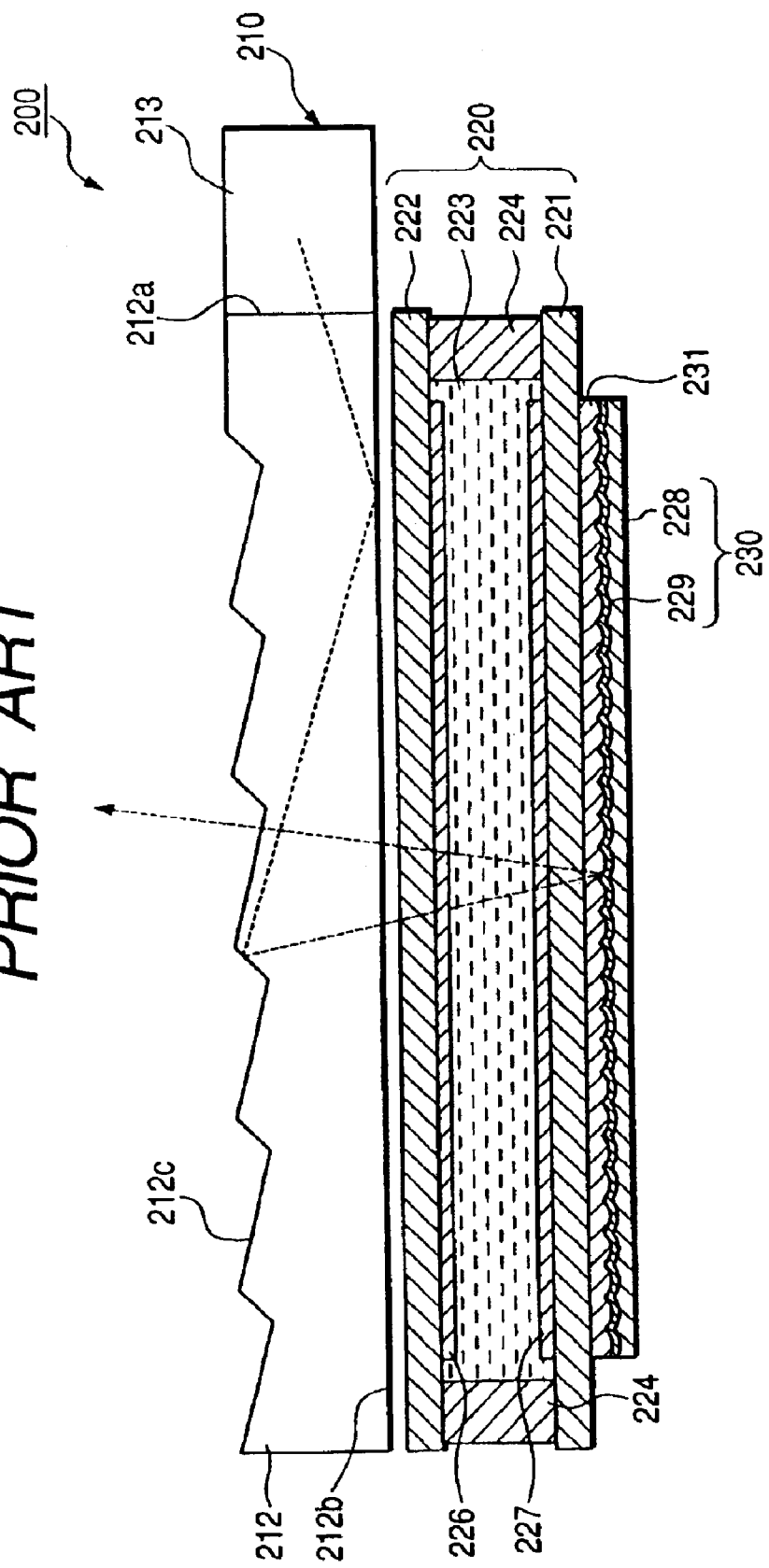
FIG. 4 is a sectional view of a conventional reflective type liquid crystal display.

FIG. 3 is a perspective view of a main part of the reflector 30 used preferably according to the embodiment. In the reflector 30, the reflector substrate 28 has a substrate 28a made of glass and a plate-shaped resin base member 28b made of a photosensitive resin layer or the like placed on the substrate 28a. A large number of recesses 35 whose inner surfaces form a part of a sphere are continuously formed on the surface of the resin base member 28b. The reflection layer 29 made of a thin metal film is provided on the surface.

The reflector 30 is produced for example by forming a resin layer of photosensitive resin on the substrate 28a, then press-attaching a transfer pattern made of silicone-based resin having an irregular surface in an inverted shape to the reflection surface of the reflector 30, and then curing the resin layer to form the resin base member 28b. A metal material having a high reflectance such as aluminum and silver is used to form the reflection layer 29 on the resin base member 28b by sputtering or vacuum vapor deposition.

Preferably, the recesses 35 on the surface of the reflector 30 are formed to have a random depth in the range from 0.1 μm to 3 μm and at a pitch in the range from 5 μm to 100 μm between adjacent recesses 35. The inclination angle of the inner surface of the recesses 35 is preferably set in the range from −30° to +30°. It is particularly important that the inclination angle distribution of the inner surface of the recesses 35 is in the range from −30° to +30° and that the pitch of adjacent recesses 35 is randomly set in all the directions of the plane. This is because the more regular the pitch of adjacent recesses 35 is, the more easily light interference can occur and the more intensely the reflected light can be colored. When the inclination angle distribution of the inner surface of the recesses 35 is outside the −30° to +30° range, the diffusion angle of the reflected light is too broad, which lowers the reflection intensity and sufficiently bright display does not result. More specifically, the diffusion angle of the reflected light is not less than 36° in the air, the reflection intensity peak in the liquid crystal display is lowered, and the reflection loss increases.

When the pitch of adjacent recesses 35 is less than 5 μm, the manufacture for a transfer pattern for the resin base member 28b must be restricted, and the working period can be much prolonged. A geometry sufficient to provide desired reflection characteristics cannot be formed or optical interference might be caused. In practice, the transfer pattern to form the surface geometry of the resin base member 28b is produced using a transfer pattern base member having many diamond indenters press-attached to the member. The tip end size of the diamond indenters is preferably in the range from 20 μm to 200 μm, and therefore the pitch of adjacent recesses 35 is preferably in the range from 5 μm to 100 μm.

Note that herein, the "depth of the recess" refers to the distance from the front surface of the reflector 30 to the bottom of the recess 35, the "pitch of adjacent recesses" refers to the distance between the centers of the recesses 35 each forming a circle when the surface of the reflector 30 is viewed two-dimensionally. The "inclination angle" refers to the angle of the tangent to the recess 35 in an arbitrary location of the inner surface in a particular vertical section with respect to the substrate surface.

The adhesive layer 31 is made of a transparent resin adhesive such as fluorine-containing epoxy-based resin. The adhesive layer 31 is made of a material having a refractive index different from that of the first substrate 21 adjacent to the adhesive layer. If the refractive indexes of the adhesive layer 31 and the first substrate 21 are equal, light is not scattered at the outer surface 21b (light scattering surface) of the first substrate 21, which is the interface between the first substrate 21 and the adhesive layer 31. Therefore, in order to effectively eliminate the rainbow on the display screen as intended by scattering light at the outer surface 21b (light scattering surface) of the first substrate 21, the difference between the refractive indexes of the adhesive layer 31 and the first substrate 21 is preferably at least 0.01. When the difference between the indexes is too large, the reflection characteristic largely departs from the designed value, and therefore the difference is preferably not more than 0.2.

When for example the first substrate 21 is made of glass, the refractive index is about 1.52, and therefore the material for the adhesive layer 31 may be a resin material having a refractive index in the range from about 1.32 to 1.72 such as acrylic resin (refractive index: 1.46), fluororesin (refractive index: 1.34), and epoxy resin (refractive index: 1.61).

The liquid crystal display 1 having the above-described structure can carry out reflective display using the ambient light such as sunlight and illumination as the illumination light and reflective display using light from the front light 10 as the illumination light.

In any of the cases, the illumination light coming into the liquid crystal cell 20 passes through the second substrate 22, the display circuit 26, the liquid crystal layer 23, the display circuit 27, the first substrate 21 and the adhesive layer 31, and then reflected by the reflection layer 29 of the reflector 30. The reflected light passes through the adhesive layer 31 and is let into the liquid crystal cell 20 from the outer surface 21b of the first substrate 21 in the reversed order from the illumination light, and then emitted from the outer side (the side of the front light 10) of the liquid crystal cell 20. Then, the light passes through the front light 10 and reaches the viewer, so that the display at the liquid crystal cell 20 is viewed by the viewer. According to the embodiment, when intense sunlight comes in, for example, and the illumination light is reflected by the reflection surface (reflection layer 29) of the reflector 30, the light is scattered as it passes through the outer surface 21b of the first substrate 21 serving as the light scattering surface despite a spectrum caused at the irregularities at the reflection surface. Therefore, the rainbow is not observed by the viewer.

The haze of the outer surface 21b of the first substrate 21 as the light scattering surface is set in the above preferred range, so that the rainbow at the display screen can be prevented, while the screen can be prevented from being darkened or a drop in the contrast can be prevented that would otherwise be caused by too much scattering of light and reduction in the reflectance of the illumination light as a result.

Since the first substrate 21 is thinner than the second substrate 22, a transparent substrate identical to the second substrate 22 may be ground or chemically etched, so that the part has a smaller thickness or is provided with a rough surface. In this way, the substrate can be produced readily and inexpensively. The liquid crystal cell is assembled using the two identical transparent substrates, and then one of the transparent substrates may be ground, so that the grinding step needs only be added to the conventional method of manufacturing the liquid crystal cell. This does not complicate the work and high manufacturing efficiency is secured.

The first substrates 21 is reduced in thickness, so that the liquid crystal display 1 can be reduced in thickness and weight. The transmission loss of the light passing through the first substrate 21 can be reduced as well.

Note that if necessary a retardation film or a polarizer may be provided on the second substrate 22 on the side of the front light 10 of the liquid crystal cell 20.

When a color filter is provided at the display circuit 27 on the first substrate 21 on the side of the reflector 30, color display can be carried out. The first substrate 21 interposed between the color filter and the reflector 30 is formed to be particularly thin, so that high definition color display with reduced color shift or parallax can be provided.

In addition, according to the embodiment, the outer surface 21b of the first substrate 21 has the irregularities in order to have a light scattering characteristic. The outer surface 21b of the first substrate 21 can be formed into a light scattering surface by other methods. For example, the light scattering characteristic can be provided by attaching a film with a scattering effect to the outer surface 21b of the first substrate 21.

EXAMPLE

Now, a specific example of the present invention will be described in order to disclose the effect of the invention, but the invention is not limited to the example.

Example 1

A liquid crystal cell 20 having the structure shown in FIG. 2 was produced. Two glass substrates (refractive index: 1.52) as thick as 0.7 mm were prepared as the first and second substrates 21 and 22. The display circuits 26, 27 were formed on respective one surfaces of the glass substrates, and then the two glass substrates were opposed so that the display circuits 26 and 27 were inside. The seal member 24 was inserted therebetween and these elements were united integrally. The space surrounded by the glass substrates and the seal member 24 was filled with liquid crystal and sealed, and then the outer surface of the glass substrate to serve as the reflector side was ground, so that the thickness became 0.2. mm. The grinding condition was set so that the haze of the ground surface attained a prescribed value.

Meanwhile, the reflector 30 having the structure shown in FIG. 3 was produced. More specifically, a resin layer of acrylic photosensitive resin was placed on one surface of a substrate 28a made of glass as thick as 0.7 mm, and then a transfer pattern of silicone-based resin was press-attached on the surface of the resin layer to form recesses 35 followed by irradiation with a ultraviolet beam for curing. In this way, the resin base member 28b was formed. A reflection layer 29 of aluminum having a thickness of 1300 Å was formed on the resin base member 28b, and the reflector 30 was thus obtained.

The reflector 30 was adhesively joined on the ground surface (outer surface 21b of the first substrate 21) of the above liquid crystal cell 20 through acrylic resin (refractive index: 1.46) so that the surface having the recesses 35 was on the side of the liquid crystal cell 20. A liquid crystal display was assembled using this.

The condition of grinding the outer surface of the glass substrate (first substrate 21) of the liquid crystal cell 20 positioned on the side of the reflector 30 was varied, while the other conditions were unchanged and liquid crystal displays were manufactured with the haze of the ground surface being varied in the range from 5% to 40% in 5% steps.

The obtained liquid crystal displays were evaluated for the display characteristics. The evaluation items of the display characteristics were the effect of rainbow elimination, the reflectance, the contrast and the total evaluation. The result is given in Table 1.

For the effect of rainbow elimination, sunlight was let into each liquid crystal display, and the display screen was observed from all the directions. In the table, O represents the case when no rainbow was observed, Δ when a rainbow was slightly observed, and x when an intense rainbow was observed.

The reflectance was obtained by measuring the quantity of light at an incident angle of −30° and an acceptance angle of 0° with respect to the normal to the display screen. In the table, O represents the case when the measured value was not less than 90% of the value at a haze of 0%, Δ when the value was more than 80% and less than 90% of that value, and x when the value was not more than 80% of that value.

For the contrast, the ratio of quantities of light between when voltage is applied and when no voltage is applied at an incoming angle of −30° and a receiving angle of 0° was appreciated. In the table, O represents the case when the ratio was not less than 80% of the value at the haze of 0%, and x when the ratio was smaller.

For the total evaluation, O represents the case when the results for the effect of rainbow elimination, the reflectance and the contrast were all O, Δ when O was not obtained for all the items, but there was no x, and x when there was x for at least one item.

TABLE 1

| haze | rainbow elimination | reflectance | contrast | total evaluation |
|---|---|---|---|---|
| 5 | x | o | o | x |
| 10 | x | o | o | x |
| 15 | Δ | o | o | Δ |
| 20 | o | o | o | o |
| 25 | o | o | o | o |
| 30 | o | Δ | o | Δ |
| 35 | o | x | x | x |
| 40 | o | x | x | x |

As in the foregoing, in the liquid crystal display according to the invention, a pair of transparent substrates are placed opposing each other with a liquid crystal layer held therebetween, one of the transparent substrates has an outer surface serving as a light scattering surface that scatters light, and a reflector having an irregular reflection surface is provided on the light scattering surface. In this way, the reflection surface is on the side of the light scattering surface. Therefore, when a spectrum is caused by the irregularities on the reflection surface when the illumination light is reflected by the reflector, the reflected light can be scattered as it passes through the light scattering surface, so that the rainbow at the display screen can be prevented, and a reflective type liquid crystal display with improved visibility can be provided.

What is claimed is:

1. A liquid crystal display comprising:

a pair of opposing transparent substrates having a liquid crystal layer held therebetween;

a reflector having an irregular reflection surface provided on one of the transparent substrates; and a light scattering element disposed between the reflection surface and the liquid crystal layer, wherein light reflected by the reflection surface is scatterd by passing through the light scattering element and a haze of said light scattering element is in a range from 15% to 30%.

2. A liquid crystal display according to claim 1, wherein the light scattering element is disposed between said one of the transparent substrates and the reflection surface.

3. A liquid crystal display according to claim 1, wherein the light scattering element is a light scattering film.

* * * * *